United States Patent
Chen

(10) Patent No.: US 10,971,185 B2
(45) Date of Patent: *Apr. 6, 2021

(54) MANAGEMENT OF MEDIA CONTENT PLAYBACK

(71) Applicant: Sonos, Inc., Santa Barbara, CA (US)

(72) Inventor: Yean-Nian W. Chen, Los Angeles, CA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/812,711

(22) Filed: Mar. 9, 2020

(65) Prior Publication Data

US 2020/0312367 A1    Oct. 1, 2020

Related U.S. Application Data

(63) Continuation of application No. 16/011,838, filed on Jun. 19, 2018, now Pat. No. 10,586,567, which is a (Continued)

(51) Int. Cl.
*G06F 17/00* (2019.01)
*G11B 20/10* (2006.01)
(Continued)

(52) U.S. Cl.
CPC ............ *G11B 20/10* (2013.01); *G06F 3/165* (2013.01); *G11B 27/00* (2013.01); *H04L 65/60* (2013.01);
(Continued)

(58) Field of Classification Search
CPC ......... G11B 20/10; G11B 27/00; G06F 3/165; H04L 65/60; H04L 67/306; H04R 27/00; H04R 2227/005; H04R 2420/07
See application file for complete search history.

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| KR | 100890993 | 3/2009 |

(Continued)

OTHER PUBLICATIONS

AudioTron Quick Start Guide, Version 1.0, Mar. 2001, 24 pages.
(Continued)

*Primary Examiner* — Joseph Saunders, Jr.
(74) *Attorney, Agent, or Firm* — McDonnell Boehnen Hulbert & Berghoff LLP

(57) ABSTRACT

Example techniques may involve managing playback of media content by a playback device. In an example implementation, a playback device receives, via the network interface from a control device of the media playback system, an instruction to queue a container of audio tracks into a queue for playback by the playback device, wherein the container of audio tracks and consists of: (a) an album, (b) a playlist, or (c) an internet radio station. While the playback device is playing back the queue and before each audio track of the playlist is played back, the playback device determines whether the respective audio track is associated with a negative preference. If the respective audio track is associated with the negative preference, the playback device advances playback over the respective audio track to the next audio track within the queue.

20 Claims, 8 Drawing Sheets

Related U.S. Application Data continuation of application No. 15/263,407, filed on Sep. 13, 2016, now Pat. No. 10,026,439, which is a continuation of application No. 14/263,743, filed on Apr. 28, 2014, now Pat. No. 9,478,247.

(51) Int. Cl.

| | | |
|---|---|---|
| *G11B 27/00* | (2006.01) | |
| *G06F 3/16* | (2006.01) | |
| *H04R 27/00* | (2006.01) | |
| *H04L 29/06* | (2006.01) | |
| *H04L 29/08* | (2006.01) | |

(52) U.S. Cl.
CPC ............ *H04R 27/00* (2013.01); *H04L 67/306* (2013.01); *H04R 2227/005* (2013.01); *H04R 2420/07* (2013.01)

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,108,686 A | 8/2000 | Williams, Jr. |
| 6,256,554 B1 | 7/2001 | DiLorenzo |
| 6,349,339 B1 | 2/2002 | Williams |
| 6,404,811 B1 | 6/2002 | Cvetko et al. |
| 6,469,633 B1 | 10/2002 | Wachter et al. |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang et al. |
| 6,763,040 B1 | 7/2004 | Hite et al. |
| 6,778,869 B2 | 8/2004 | Champion |
| 6,826,283 B1 | 11/2004 | Wheeler et al. |
| 6,915,176 B2 | 7/2005 | Novelli et al. |
| 6,985,694 B1 | 1/2006 | De Bonet et al. |
| 7,124,125 B2 | 10/2006 | Cook et al. |
| 7,130,608 B2 | 10/2006 | Hollstrom et al. |
| 7,130,616 B2 | 10/2006 | Janik |
| 7,143,939 B2 | 12/2006 | Henzerling |
| 7,236,739 B2 | 6/2007 | Chang et al. |
| 7,236,773 B2 | 6/2007 | Thomas |
| 7,295,548 B2 | 11/2007 | Blank et al. |
| 7,483,538 B2 | 1/2009 | McCarty et al. |
| 7,496,623 B2 | 2/2009 | Szeto et al. |
| 7,496,633 B2 | 2/2009 | Szeto et al. |
| 7,571,014 B1 | 8/2009 | Lambourne et al. |
| 7,599,685 B2 | 10/2009 | Goldberg et al. |
| 7,630,501 B2 | 12/2009 | Blank et al. |
| 7,643,894 B2 | 1/2010 | Braithwaite et al. |
| 7,657,224 B2 | 2/2010 | Goldberg et al. |
| 7,657,910 B1 | 2/2010 | McAulay et al. |
| 7,725,533 B2 | 5/2010 | Szeto et al. |
| 7,725,551 B2 | 5/2010 | Szeto et al. |
| 7,739,271 B2 | 6/2010 | Cook et al. |
| 7,742,740 B2 | 6/2010 | Goldberg et al. |
| 7,797,471 B2 | 9/2010 | Laefer et al. |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,916,877 B2 | 3/2011 | Goldberg et al. |
| 7,917,082 B2 | 3/2011 | Goldberg et al. |
| 7,987,294 B2 | 7/2011 | Bryce et al. |
| 7,995,899 B2 | 8/2011 | Heredia et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,103,009 B2 | 1/2012 | McCarty et al. |
| 8,214,873 B2 | 7/2012 | Weel |
| 8,230,099 B2 | 7/2012 | Weel |
| 8,234,395 B2 | 7/2012 | Millington |
| 8,271,114 B2 | 9/2012 | Lydon et al. |
| 8,386,413 B2 | 2/2013 | Samadani |
| 8,483,853 B1 | 7/2013 | Lambourne |
| 8,595,793 B2 | 11/2013 | Kashyap et al. |
| 8,910,265 B2 | 12/2014 | Lang et al. |
| 9,286,384 B2 | 3/2016 | Kuper et al. |
| 9,335,818 B2 | 5/2016 | Ye et al. |
| 9,367,587 B2 | 6/2016 | Bieschke et al. |
| 9,374,607 B2 | 6/2016 | Bates et al. |
| 9,665,339 B2 | 5/2017 | Reimann et al. |
| 10,296,884 B2 | 5/2019 | Lang et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0056117 A1 | 5/2002 | Hasegawa et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2004/0088328 A1 | 5/2004 | Cook et al. |
| 2006/0161621 A1 | 7/2006 | Rosenberg et al. |
| 2006/0253436 A1 | 11/2006 | Cook et al. |
| 2007/0088747 A1 | 4/2007 | Cheng et al. |
| 2007/0142944 A1 | 6/2007 | Goldberg et al. |
| 2007/0294131 A1 | 12/2007 | Roman et al. |
| 2008/0052371 A1 | 2/2008 | Partovi et al. |
| 2008/0124056 A1 | 5/2008 | Concotelli |
| 2009/0083117 A1 | 3/2009 | Svendsen et al. |
| 2009/0138805 A1 | 5/2009 | Hildreth |
| 2009/0307062 A1 | 12/2009 | Lutnick et al. |
| 2010/0017366 A1 | 1/2010 | Robertson et al. |
| 2010/0050202 A1 | 2/2010 | Kandekar et al. |
| 2010/0138517 A1 | 6/2010 | De Los Reyes et al. |
| 2010/0205222 A1 | 8/2010 | Gajdos et al. |
| 2010/0215336 A1 | 8/2010 | McLean |
| 2010/0235741 A1 | 9/2010 | Newman et al. |
| 2010/0262909 A1 | 10/2010 | Hsieh |
| 2011/0106954 A1 | 5/2011 | Chatterjee et al. |
| 2011/0113051 A1 | 5/2011 | Lindahl et al. |
| 2011/0265003 A1 | 10/2011 | Schubert et al. |
| 2012/0070017 A1 | 3/2012 | Dorogusker et al. |
| 2012/0071996 A1 | 3/2012 | Svendsen |
| 2013/0073584 A1 | 3/2013 | Kuper et al. |
| 2013/0191454 A1 | 7/2013 | Oliver et al. |
| 2013/0268396 A1 | 10/2013 | Agevik et al. |
| 2013/0279878 A1 | 10/2013 | Haverkamp |
| 2013/0347018 A1 | 12/2013 | Limp et al. |
| 2014/0123006 A1 | 5/2014 | Chen et al. |
| 2014/0129015 A1 | 5/2014 | Lindahl et al. |
| 2014/0200893 A1 | 7/2014 | Vanjani |
| 2014/0277639 A1 | 9/2014 | Gomes-Casseres et al. |
| 2014/0331332 A1 | 11/2014 | Arrelid et al. |
| 2015/0066494 A1 | 3/2015 | Salvador et al. |

FOREIGN PATENT DOCUMENTS

| | | |
|---|---|---|
| WO | 200153994 | 7/2001 |
| WO | 2003093950 A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: the ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Office Action dated Jan. 31, 2020, issued in connection with European Application No. 15786825.8, 5 pages.
European Patent Office, European Office Action dated Oct. 31, 2018, issued in connection with European Application No. 157868258, 7 pages.

(56) References Cited

OTHER PUBLICATIONS

European Patent Office, European Search Report dated Jul. 18, 2017, issued in connection with EP Application No. 157868258, 7 pages.
Final Office Action dated Apr. 7, 2016, issued in connection with U.S. Appl. No. 14/263,750, filed Apr. 28, 2014, 26 pages.
International Bureau, International Preliminary Report on Patentability dated Apr. 3, 2014, issued in connection with International Application No. PCT/US2012/056467, filed on Sep. 21, 2011, 11 pages.
International Bureau, International Preliminary Report on Patentability dated Nov. 10, 2016, issued in connection with International Application No. PCT/US2015/027761, filed on Apr. 27, 2015, 8 pages.
International Searching Authority, International Search Report and Written Opinion dated Jul. 13, 2015, issued in connection with International Application No. PCT/US2015/027761, filed on Apr. 27, 2015, 12 pages.
International Searhing Authority, International Search Report and Written Opinion dated Feb. 28, 2013, issued in connection with International Application No. PCT/US2012/056467, filed on Sep. 21, 2012, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jan. 5, 2016, issued in connection with U.S. Appl. No. 14/263,743, filed Apr. 28, 2014, 10 pages.
Non-Final Office Action dated Jul. 10, 2019, issued in connection with U.S. Appl. No. 16/011,838, filed Jun. 19, 2018, 17 pages.
Non-Final Office Action dated Sep. 24, 2015, issued in connection with U.S. Appl. No. 14/263,750, filed Apr. 28, 2014, 20 pages.
Non-Final Office Action dated Nov. 28, 2017, issued in connection with U.S. Appl. No. 15/338,816, filed Oct. 31, 2016, 18 pages.
Notice of Allowance dated Aug. 11, 2016, issued in connection with U.S. Appl. No. 14/263,750, filed Apr. 28, 2014, 12 pages.
Notice of Allowance dated Jun. 15, 2016, issued in connection with U.S. Appl. No. 14/263,743, filed Apr. 28, 2014, 5 pages.
Notice of Allowance dated Mar. 20, 2018, issued in connection with U.S. Appl. No. 15/263,407, filed Sep. 13, 2016, 8 pages.
Notice of Allowance dated Oct. 23, 2019, issued in connection with U.S. Appl. No. 16/011,838, filed Jun. 19, 2018, 7 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

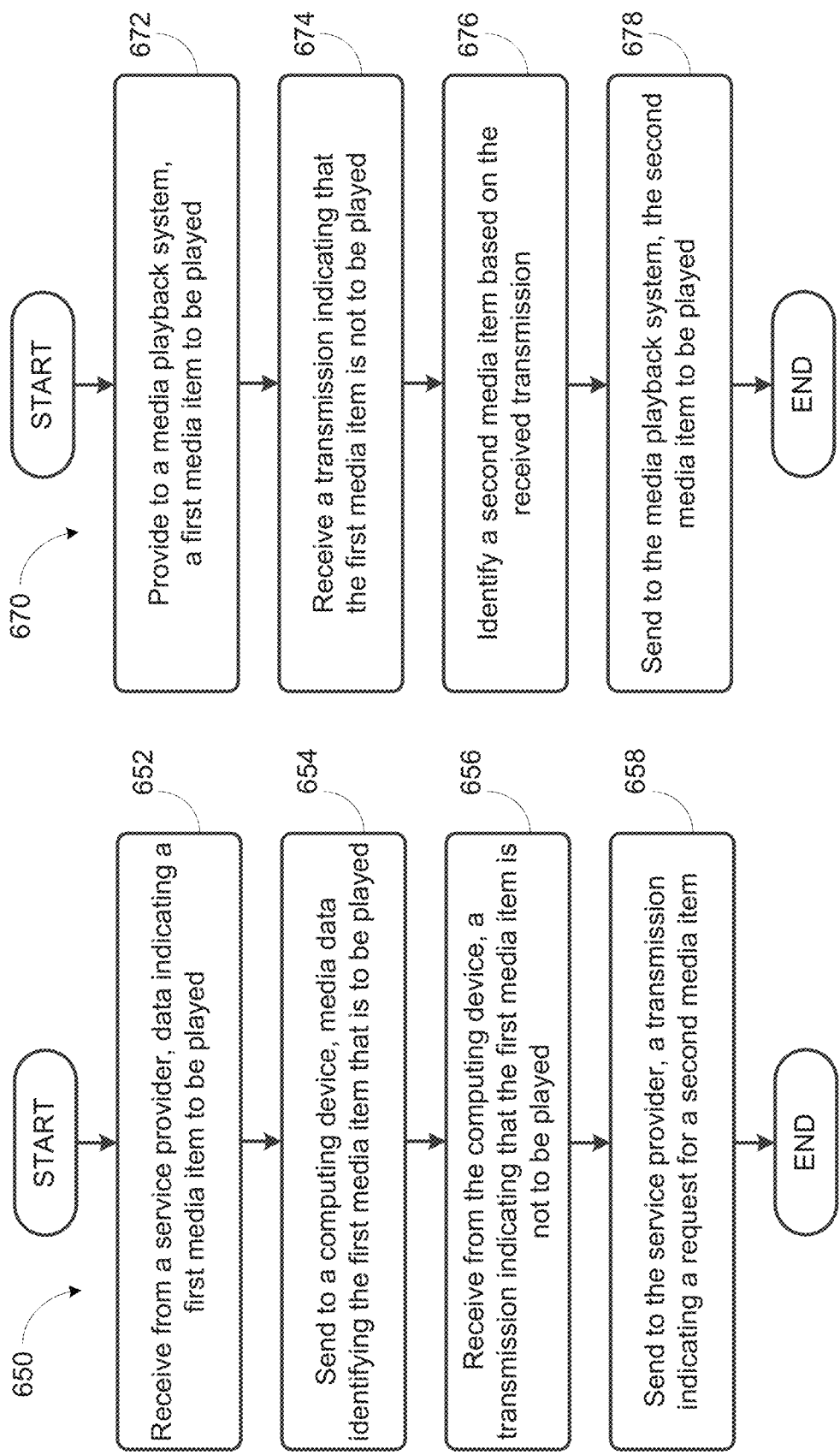

| User Account | Track ID | Track Artist | Track Album | Preference |
|---|---|---|---|---|
| User1 | Track 1 | Artist1 | Album1 | - |
| User1 | Track 2 | Artist1 | Album1 | - |
| User1 | Track 6 | Artist2 | Album3 | + |
| User1 | ... | Artist2 | ... | - |
| User1 | Track9 | Artist3 | Album6 | + |
| User2 | Track12 | ... | ... | - |
| User2 | Track9 | Artist3 | ... | + |
| User2 | Track5 | Artist2 | Album3 | - |
| User2 | ... | Artist1 | Album1 | - |
| User3 | Track7 | Artist1 | ... | - |
| User3 | Track13 | Artist5 | Genre 3 | + |
| ... | ... | ... | ... | ... |
| ... | ... | ... | ... | ... |

MANAGEMENT OF MEDIA CONTENT PLAYBACK

CROSS REFERENCE TO RELATED APPLICATIONS

This application claims priority under 35 U.S.C. § 120 to, and is a continuation of, U.S. patent application Ser. No. 16/011,838, filed on Jun. 19, 2018, entitled "Management of Media Content Playback," the contents of which are fully incorporated by reference herein in their entirety.

U.S. patent application Ser. No. 16/011,838 claims priority under 35 U.S.C. § 120 to, and is a continuation of, U.S. patent application Ser. No. 15/263,407, filed on Jun. 19, 2018, entitled "Management of Media Content Playback," and issued as U.S. Pat. No. 10,026,439 on Jul. 17, 2018, the contents of which are fully incorporated by reference herein in their entirety.

U.S. patent application Ser. No. 15/263,407 claims priority under 35 U.S.C. § 120 to, and is a continuation of, U.S. patent application Ser. No. 14/263,743, filed on Apr. 28, 2014, entitled "Management of Media Content Playback," issued as U.S. Pat. No. 9,478,247 on Oct. 25, 2016, the contents of which are fully incorporated by reference herein in their entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were severely limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from virtually unlimited sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 6B shows a second example flow diagram for managing playback of media content;

FIG. 6C shows a third example flow diagram for managing playback of media content;

FIG. 7 shows aspects of an example media preference database.

Figure 1:
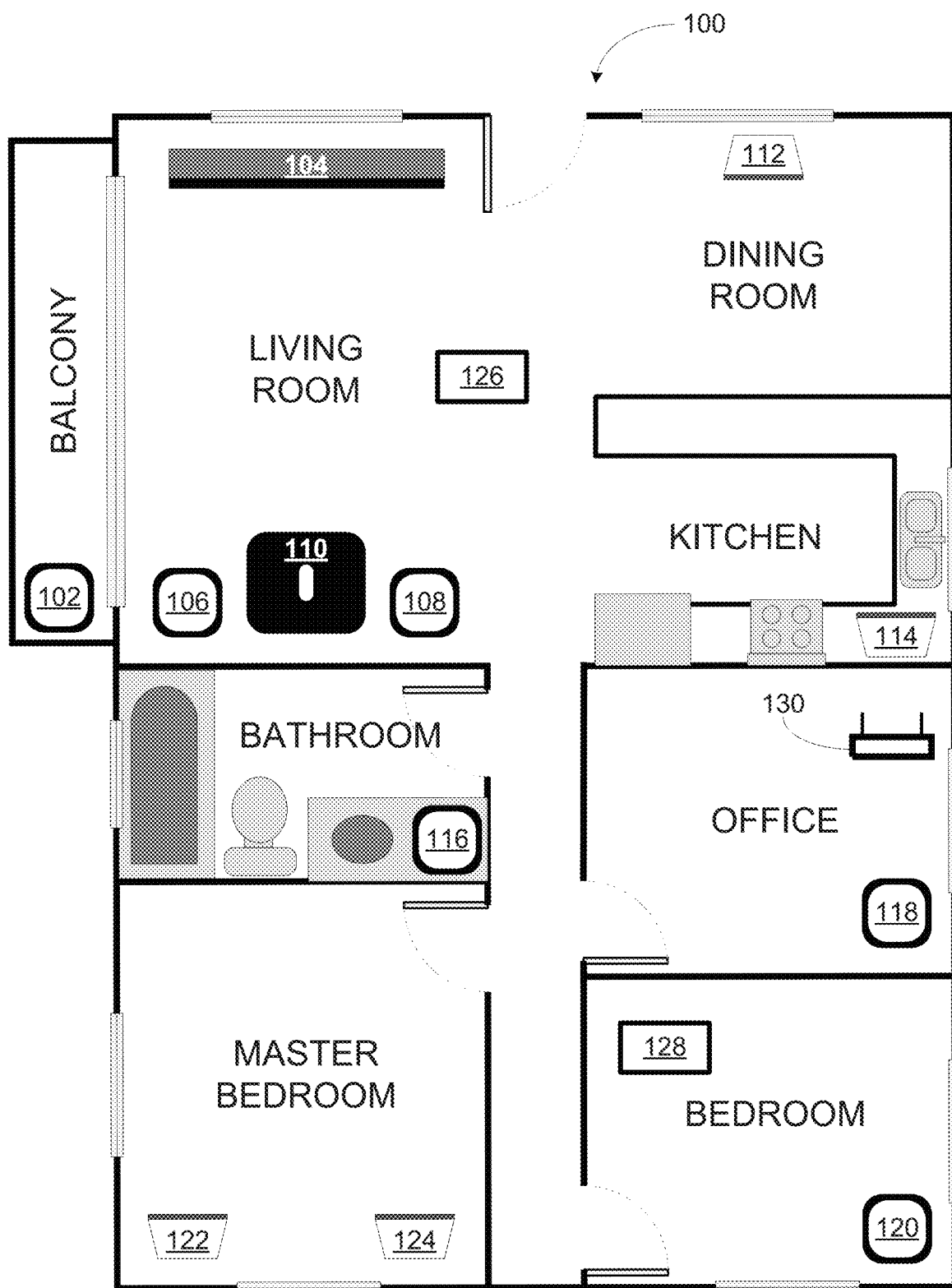
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Some embodiments described herein involve managing playback of media content by a media playback system based on identified preference data associated with a user account interfacing with the media playback system. In particular, the embodiments may involve preventing media content from being played if the user account has a negative preference associated with the media content.

In one example, a computing device, such as a media system server associated with a media playback system may store and maintain a plurality of user accounts associated with the media playback system. The computing device may then receive user data identifying which of the plurality of user accounts is interfacing with the media playback system at a current time. For example, the user account may be interfacing with the media playback system when the user account is being used to access the media playback system, when the user account is logged on to the media playback system, and/or when a controller device associated with the user account is in communicative range of the media playback system. In one case, the user data may indicate that users associated with some of the plurality of user accounts are within a physical proximity of the media playback system, and consequently may experience media content played by the media playback system.

The computing device may also receive media data identifying a media item to be played by the media playback system. In one example, the media item may be a music track provided by a service provider in response to an input via a first user account of the plurality of user accounts. In one case, the service provider may provide the music track based on media preferences associated with the first user account. In another example, the music track may be part of a playlist provided by the service provider according to a request via the first user account. In either case, the music track that is to be played may be provided at least partially based on preferences associated with the first user account.

In one example, the user data may indicate that a second user account is interfacing with the media playback system, and accordingly, one or more users associated with the second user account may be present where media content is or will be played by the media playback system. Accordingly, media preferences associated with the second user account may also be considered when the media playback system is, or will be playing the music track.

In particular, the computing device may identify, for at least the second user account, preference data associated with the media item. The media data may include metadata identifying the media item, and the computing device may use the metadata to identify preference data associated between the media item and the second user account. In one example, the preference data may be identified in a preference database associated with the media playback system. The computing device may then determine whether the media item should be played based on the identified preference data.

If the identified preference data indicates a negative preference, the computing device may determine the media item should not be played, and send a transmission to the media playback system indicating that the media item is not to be played. Alternatively, if the identified preference data indicates a positive preference, or if no preference is identified, the media playback system may proceed to play the media item.

While the above examples refer to a first user account and a second user account, one having ordinary skill in the art will appreciate that the plurality of user accounts may include additional accounts, and that preferences associated with the additional accounts may also be identified and considered when the media playback system plays media content. In addition, while the above examples refer to actions performed by a computing device, such as a media system server associated with a media playback system, similar actions may alternatively be performed at least in part, by one or more devices in the media playback system. Other examples are also possible.

As indicated above, the examples provided herein involve managing playback of media content by a media playback system based on identified preference data associated with one of a plurality of user accounts interfacing with the media playback system. In one embodiment, a method is provided. The method involves maintaining, by a computing device, a plurality of user accounts associated with a media playback system, the media playback system comprising at least one playback device, receiving, by the computing device, user data identifying which of the plurality of user accounts are currently interfacing with the media playback system, receiving, by the computing device, media data identifying a media item to be played by the media playback system, identifying, by the computing device, for at least one of the plurality of user accounts that are currently interfacing with the media playback system, preference data associated with the media item, and determining, by the computing device, that the media item is not to be played by a media playback system, based on the identified preference data.

In another embodiment, a device is provided. The device includes a processor, and memory having stored thereon instructions executable by the processor to cause the device to perform functions. The functions include maintaining a plurality of user accounts associated with a media playback system, the media playback system comprising at least one playback device, receiving user data identifying which of the plurality of user accounts are currently interfacing with the media playback system, receiving media data identifying a media item to be played by the media playback system, identifying for at least one of the plurality of user accounts that are currently interfacing with the media playback system, preference data associated with the media item, and determining that the media item is not to be played by a media playback system, based on the identified preference data.

In yet another embodiment, a non-transitory computer readable memory is provided. The non-transitory computer readable memory has stored thereon instructions executable by a computing device to cause the computing device to perform functions. The functions include maintaining a plurality of user accounts associated with a media playback system, the media playback system comprising at least one playback device, receiving user data identifying which of the plurality of user accounts are currently interfacing with the media playback system, receiving media data identifying a media item to be played by the media playback system, identifying for at least one of the plurality of user accounts that are currently interfacing with the media playback system, preference data associated with the media item, and determining that the media item is not to be played by a media playback system, based on the identified preference data.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
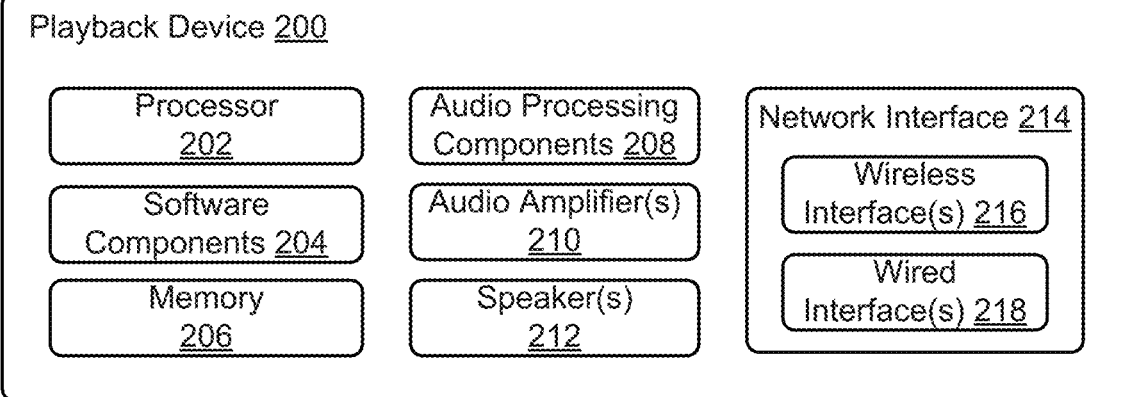
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
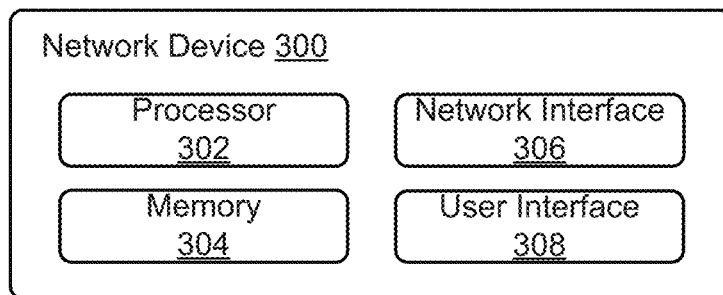
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
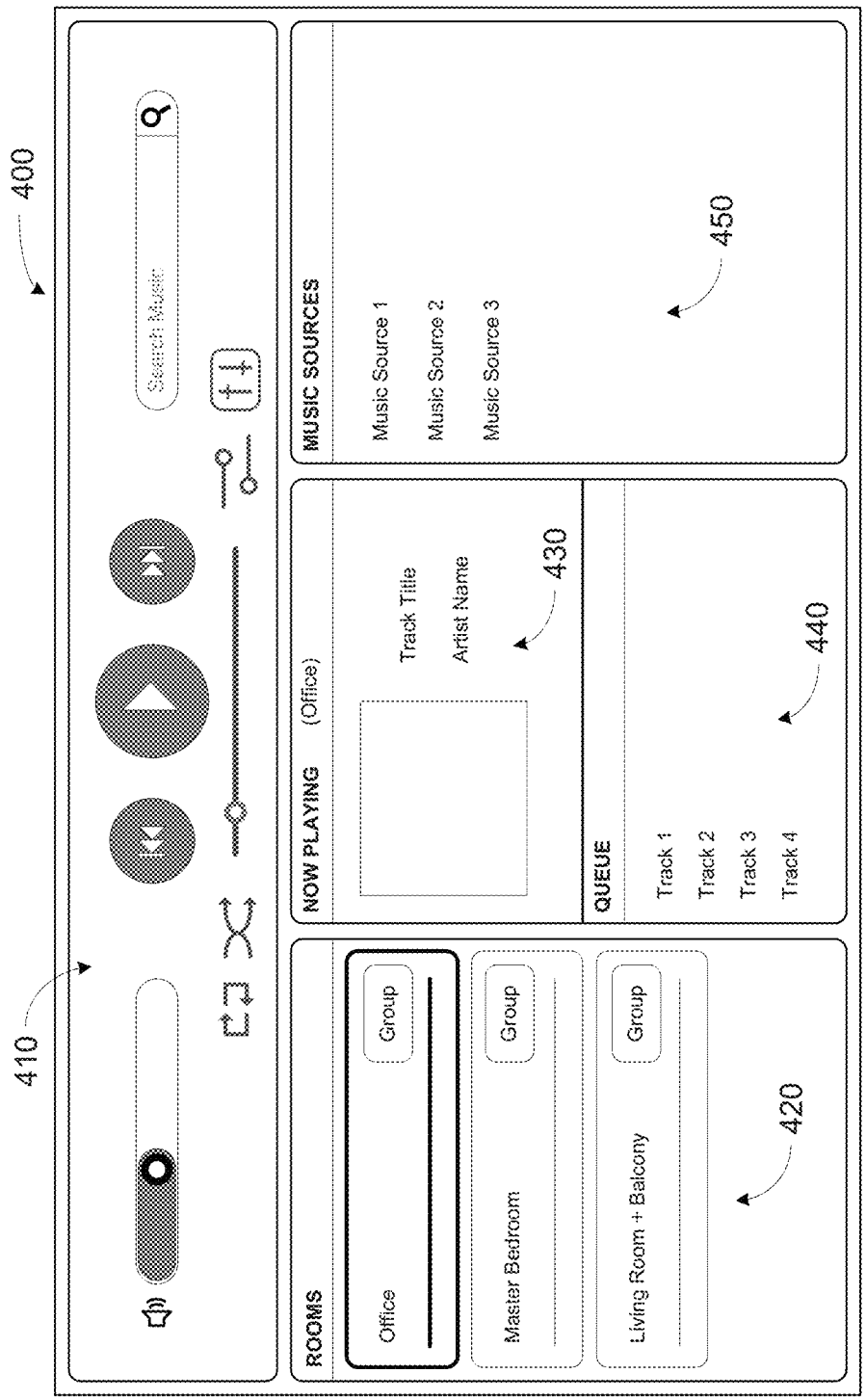
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods for Managing Playback of Media Content

As discussed above, embodiments described herein may involve managing playback of media by a media playback system based on identified preference data associated with user accounts interfacing with the media playback system. FIG. 500 shows an example media playback system environment 500 within which the embodiments may be implemented. As shown, the media playback system environment 500 includes an example service provider 502, an example media system server 504, an example media playback system 506, an example first user account 508, and an example second user account 510. The first user account 508 and the second user account 510 may be two of a plurality of user accounts for accessing the media playback system 506 and/or the service provider 502. As such, one or more controller devices, such as the control device 300 of FIG. 3, may communicate with the media playback system 506 and/or the service provider 502 (and other service providers) using the first user account 508 and/or the second user account 510. Each of the service provider 502, media system server 504, media playback system 506, and any controller device(s) associated with the first user account 508 or the second user account 510 may communicate with each other either directly, or indirectly via another device, over a local area network (LAN), wide area network (WAN) or some combination thereof.

The media playback system 506 may be a playback system such as that described above in connection to FIG. 1, and may include one or more playback devices configured to play media content in synchrony within one or more playback zones. As indicated above, the first user account 508 and the second user account 510 may be used to utilize the media playback system 506.

The media system server 504 may be a server associated with the media playback system 506, and may store information relating to the media playback system 506. Such information may include playback device information, playback zone information, service provider association information, and/or user account information, among other information.

The service provider 502 may provide media content for playback by the media playback system 506. In one example, the service provider 502 may be a media streaming service. The content provided by the service provider 502 may include individual media items or collections of media items (i.e. albums, playlists, radio channels, etc.). The service provider 502 may provide media content in response to specific requests for explicitly chosen media items, (i.e. requests for specific tracks, albums, etc), or requests for certain types of media content (i.e. a catered playlist, radio channels, etc). The service provider 502 may also provide catered playlists of media content based on user preferences and input. For instance, if a service provider user account for the service provider 502 indicates that the user enjoys a particular genre of music, the service provider 502 may provide music within the particular genre, or music within similar, or related genres. Other examples of services that may be available through service provider 502 are also possible.

In one example, the first user account 508 may be used to request media content from the service provider 502. As such, the service provider 502 may provide media content for playback by the media playback system 506 based on media preferences associated with the first user account 508, and/or according to requests from the first user account 508. In some cases, however, the service provider 502 may provide media content that has a negative preference associated with the second user account 510 while users associated with the second user account 510 are present where the music is, or will be playing. Embodiments described herein may be implemented for managing playback of media content based at least partially on media preference associated with the second user account 510, even when the media content is provided in response to a request via the first user account 508.

Figure 5:
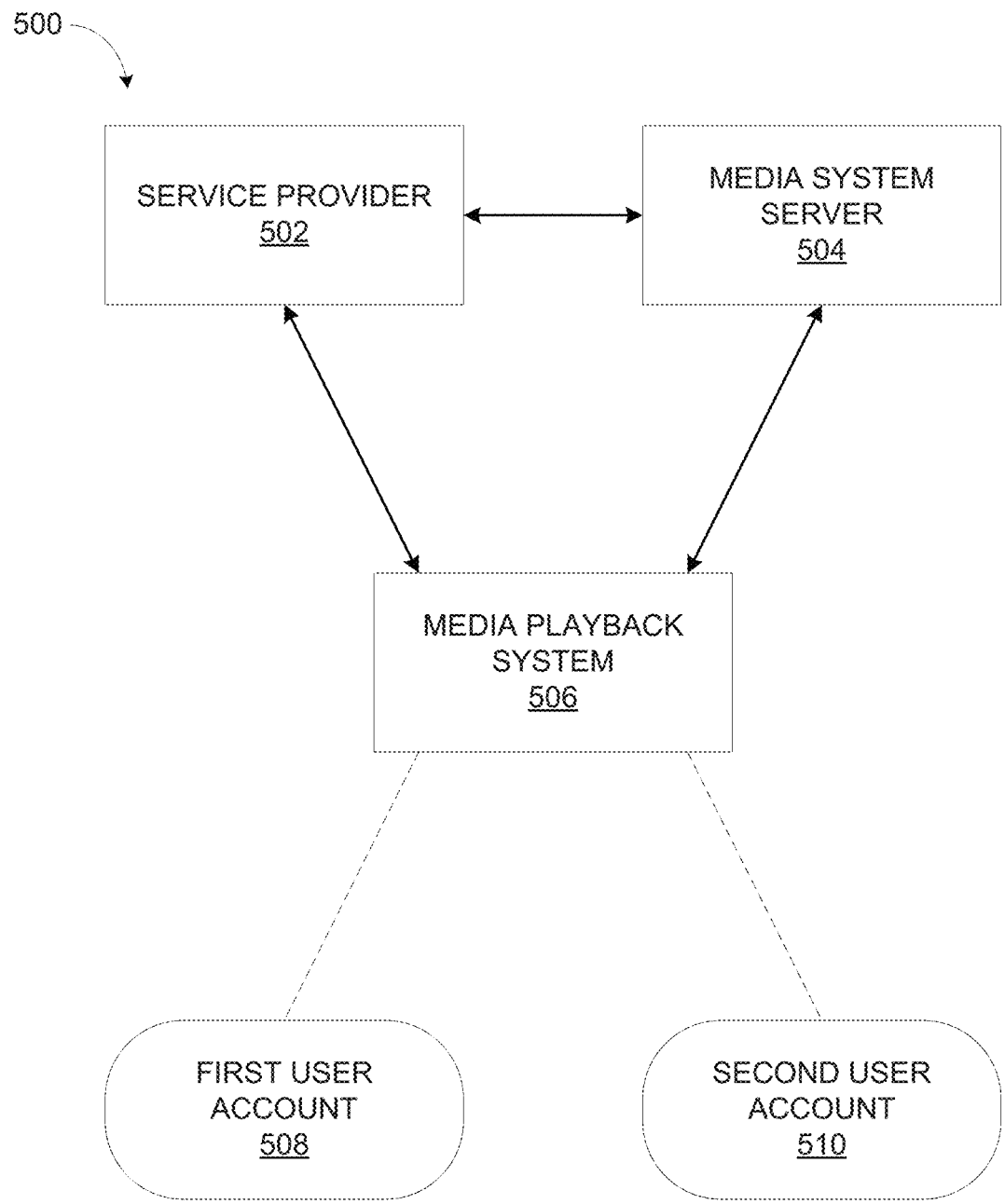
FIG. 5 shows an example media playback environment.
Figure 6A:
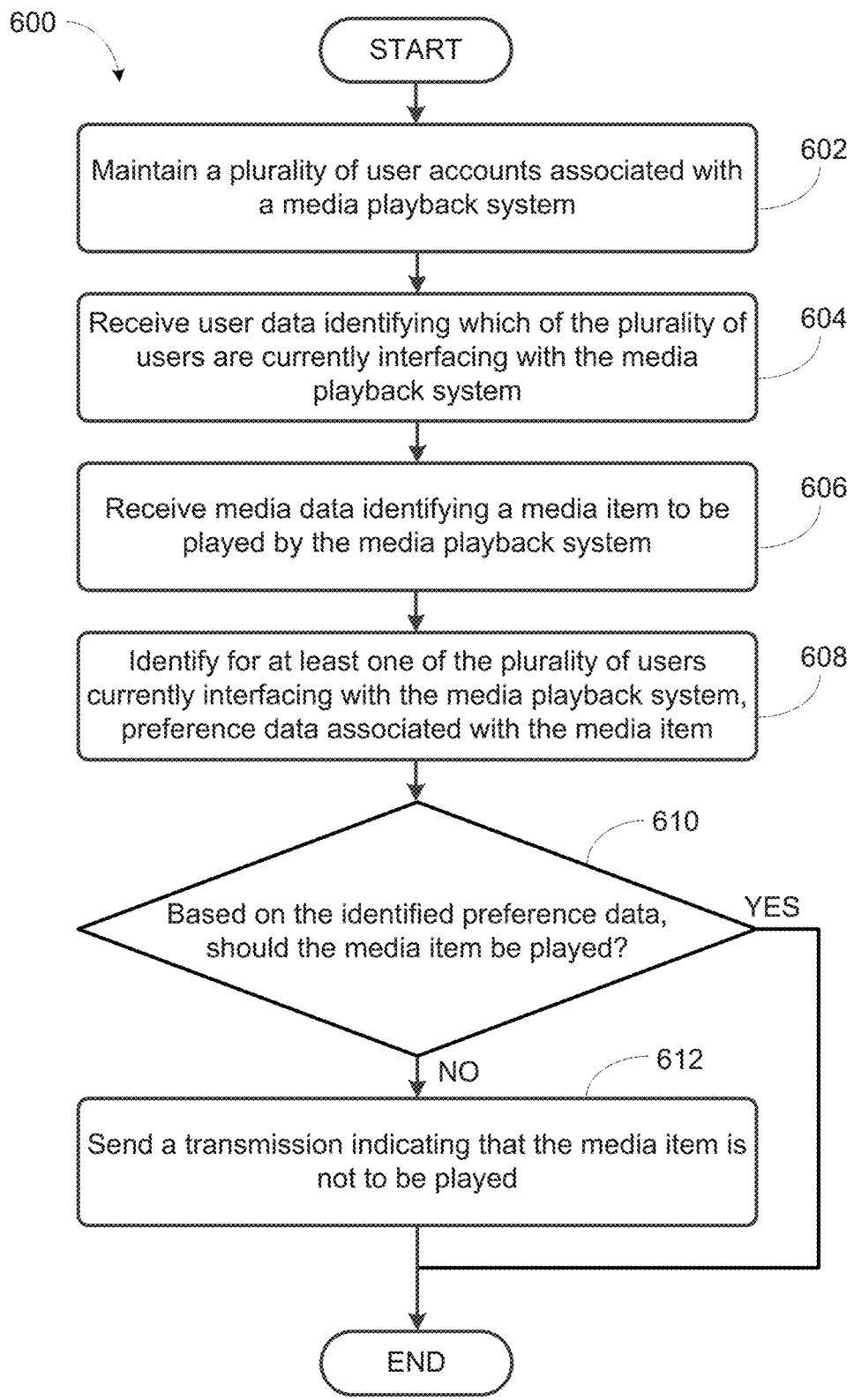
FIG. 6A shows a first example flow diagram for managing playback of media content.

FIG. 6A shows an example flow diagram of an example method 600 for such an embodiment. Method 600 shown in FIG. 6A presents an embodiment of a method that can be implemented within an operating environment involving, for example, the media playback system 100 of FIG. 1, one or more of the playback device 200 of FIG. 2, one or more of the control device 300 of FIG. 3, and the media playback system environment 500 of FIG. 5. In other words, the method 600 may be performed by any one or more of the devices, systems, and servers described above. In one example, the functions of the embodiments as discussed herein are performed by the media system server 504. In another example, the functions may alternatively be performed by one or more devices in the media playback system 506. In a further example, the functions may be performed in part by the media system server 504 and in part by one or more devices in the media playback system 506. Other examples are also possible.

Method 600 may include one or more operations, functions, or actions as illustrated by one or more of blocks 602-612. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may be any other volatile or non-volatile storage systems. The computer readable medium may be considered a computer readable storage medium, for example, or a tangible storage device. In addition, for the method 600 and other processes and methods disclosed herein, each block in FIG. 6A may represent circuitry that is wired to perform the specific logical functions in the process.

At block 602, the method 600 involves maintaining a plurality of user accounts associated with a media playback system. In one example, the media system server 504 may store a database containing user account information for the plurality of user accounts associated with the media playback system 506. Each of the user accounts may be used to access the media playback system 506. For instance, a user may log on to the media playback system 506 using one of the plurality of user accounts. As suggested above, the plurality of user accounts associated with the media playback system may include the first user account 508 and the second user account 510.

At block 604, the method 600 involves receiving user data identifying which of the plurality of user accounts are currently interfacing with the media playback system. In one example, a user account may be considered to be interfacing with the media playback system if the user account is logged on the media playback system 506, actively interacting with the media playback system, and/or tied to a controller device in communication with the media playback system. In one case, media playback system 506 may provide the media system server 504 with user data identifying currently interfacing user accounts. The media playback system 506 may provide this information periodically, whenever a user account becomes active/not active, or whenever it is about to play a media item. In another example, the media system server 504 may periodically send to the media playback system 506, a request for a current/updated user data. In response, the media playback system 506 may identify which user accounts are currently interfacing with the media playback system 506, and send to the media system server 504, the user data identifying the currently interfacing user accounts.

In another case, the media system server 504 may send the request for the current/updated user data when such information is needed. For instance, the media system server 504 may send the request when determining whether media content is to be played by the media playback system 506 based at least partially on actively interfacing user accounts. As such, in some embodiments, block 604 may be implemented after block 606, which is discussed below.

At block 606, the method 600 involves receiving media data identifying a media item to be played by the media playback system. In one example, the service provider 502 may provide the media item to the media playback system 506 for playback. Then, based on the received media item, the media playback system 506 may send the media data identifying the media item to the media system server 504. In another example, the server provider 502 may send the media data directly to the media system server 504 prior to, or concurrently with providing the media item to the media playback system 506 for playback. Other examples are also possible.

In one example, the media item may be provided by the service provider 502 in response to an input received via the first user account. In such a case, the media item may have been selected by the service provider 502 based on media preferences associated with the first user account 508.

The media data may include metadata identifying the media item. For instance, the metadata may indicate one or more of a track title, artist name, album name, genre, or contextual information such as a time of day, season, or activity the media item may be associated with or suitable for, among others. In some cases, the metadata may further indicate a service-provider identifier used by the service provider 502 to identify the media item.

At block 608, the method 600 involves identifying, for at least one of the plurality of user accounts that are currently interfacing with the media playback system, preference data associated with the media item. Continuing with the examples above, if the user data indicates that the first user account 508 and the second user account 510 are currently interfacing the media playback system 506, preference data associated between the media item and the first user account 508, and preference data associated between the media item and the second user account 510 may both be identified. Preference data associated between the media item and any other user accounts currently interfacing the media playback system 506 may also be identified.

For illustration purposes, the following discussion of preference data identification at block 608 may generally involve identifying preference data associated between the media item and the second user account 510. One having ordinary skill in the art will appreciate that the relevant descriptions and examples may also be applied to any other user accounts identified in the user data as currently interfacing the media playback system 506.

In one example, if the second user account 510 is associated with one or more service providers including the service provider 502, the preference data may be identified by querying one or more of the service providers for any media preferences associated with the media item and user accounts that are currently interfacing the media playback system 506. In another example, the preference data may be identified in a preference database that is affiliated with the media playback system 506. The preference database may contain preference data associated between media items and user accounts associated with the media playback system 506. As such, the preference database may include preference data indicating preferences associated with at least the first user account 508 and the second user account 510.

FIG. 7 shows aspects of an example preference database 700 that may include information associated with the media playback system 506. In one example, the preference database 700 may be stored on one or more remote servers, such as the media system server 504. In another example, the preference database may be stored on one or more local devices in communication with the media playback system 506. In a further example, parts of the preference database may be stored on the one or more remote servers and the one or more local devices. Other examples are also possible.

As shown, the preference database 700 includes columns for data identifying a media item, including a track ID column, a track artist column, and a track album column. For each media item entry, preference data associated with the media item entry is shown in a preference column. In this example, a "+" in the preference column may indicate a positive preference for the respective entry, and a "−" in the preference column may indicate a negative preference for the respective entry. In some cases, the format of the preference data may alternatively be on a gradient scale, rather than a binary scale. For instance, a preference may range from one to five.

Further, a user account associated with a media item entry may be provided in a user account column. In this illustrative example, a user account of "User1" may indicate that the respective media item entries and preference data are associated with the first user account 508, and a user account of "User2" may indicate that the respective media item entries and preference data are associated with the second user account 510.

One having ordinary skill in the art will appreciate that the preference database 700 and the entries shown in FIG. 7 are for illustration purposes only and should not be considered limiting, as other database formats for storing preference data are also possible. For instance, additional columns for information associated with the media item entries, preferences, or user accounts may also be included. Other examples are also possible.

Referring back to block 608, identifying preference data associated with the media item may involve searching the preference database for a media item entry that is associated with the user accounts currently interfacing the media playback system 506, and that is related to the media item. Preference data corresponding to the media item entry may then be identified as being associated with the media item.

The searching may be based on the metadata identifying the media item. In one example, referring to FIG. 7, if the metadata identifying the media item indicates a track ID of "Track5" and a track artist name of "Artist2," preference data for a media item entry having a user account of User2 (for the second user account 510) and matching track title and artist name, may be identified in the preference database. As shown in the preference database 700, preference data indicating a negative preference may be identified as being associated with the second user account 510 and the media item entry having the track ID of Track5 and the track artist of Artist2.

In some cases, the search for database entries in the preference database may be implemented such that exact matches are required. For instance, if the received metadata indicates a different album name than "Album3" as shown in FIG. 7, then the preference associated with Track5 and Artist2 may not be identified as relevant to the media item.

In some other cases, the search for database entries in the preference database 700 may be implemented according to an approximate string matching (or "fuzzy matching"). In such a case, if the received metadata indicates a different album name than Album3 for Track5 and Artist2, the preference data associated with the media item entry in the preference database 700 having a track title of Track5 and an artist name of Artist2 may still be recognized as being applicable to the media item.

In some other cases, the identified preference data may be associated with media content similar to the media item, and thus indirectly associated with the particular media item. For instance, the metadata for the media item may indicate a track artist of the media item. In this case, preference data corresponding to media item entries having the track artist may be identified for the media item. Other implementations of database searching, including combinations of the examples discussed above are also possible.

In one example, the second user account 510 may further, or alternatively, be a user account used to access another media playback system. In such a case, a different preference database affiliated with the other media playback system may also contain preference data associated with the second user account 510. Accordingly, identifying the preference associated with the second user account 510 may involve searching in the different preference database for media item entries associated with the media item and the second user account 510. In one example, the other media playback system may be similar to the media playback system 506. In some cases, the different preference database may be of a similar format as the preference database 700. In one case, the different preference database may be stored on the media system server 540 along with the preference database 700. Other examples are also possible.

Referring back to the method 600, block 610 involves determining, based on the identified preference data, whether the media item should be played. In one case, the identified preference data may indicate a simple positive preference or negative preference. In another case, the identified preference data may indicate multiple preferences that are generally positive or negative. In either case, if the identified preference data indicates a clearly positive preference, a determination may be made that the media item should be played. On the other hand, if the identified preference data indicates a clearly negative preference, a determination may be made that the media item should not be played.

In some other cases, the identified preference data may indicate multiple preferences, including both positive and negative preferences. For instance, the preference data may indicate preferences from multiple user accounts that are currently interfacing the media playback system 506. In such cases, a determination may be made based on the different preferences. In one example, the different preferences may be weighted differently based on their respective associations between the media item (i.e. how close of a match between the corresponding media item entry and the media item), and a determination of whether the media item should be played may be based on an average or sum of the weighted preferences. In such a case, a preference threshold may be implemented such that a determination is made that the media item should be played only if the average or sum of the weighted preferences exceeds the threshold. Other examples are also possible.

As shown in FIG. 6, if at block 610, a determination is made that the media item should be played, the media playback system 506 may in one example, proceed to play the media item. Alternatively, in some embodiments, a transmission indicating that the media item is to be played may be sent to one or more playback devices in the media playback system 506. In some cases, if the media item is provided to the one or more playback devices from the service provider 502 via the media system server 504, or another device in the media playback system 506, a transmission or forwarding of the media item to the one or more playback devices in the media playback system 506 may indicate that the media item is to be played.

Alternatively, if a determination is made that the media item should not to be played, the method 600 may proceed to block 612, which involves sending a transmission indicating that the media item is not to be played. In one example, the transmission may inform the one or more playback devices in the media playback system 506 that the media item will not be provided because a determination is made that the media item should not be played.

In one example, the media system server 504 may directly send the transmission to the service provider 502. In another example, the media playback system 506, upon receiving the transmission, may send the transmission to the service provider 502. In one case, the media playback system 506 may also send a request for different media content. In another example, the media playback system 506 may also send to the service provider 502, preference data indicating a negative preference associated between the media item that is not to be played and the second user account 510. In this case, if the second user account 510 is an account used to access the service provider 502, the service provider 502 may record the negative preference for the media item in association with the second user account 510. Other examples are also possible.

In some embodiments, a transmission may also be sent to one or more controller devices in communication with the media playback system 506. The respective user interfaces of the one or more controller devices may accordingly display an indication that a media item was not played based on an identified preference. In some cases, the indication may identify the media item that was not played.

In the examples discussed above, the media system server 504 may communicate directly with both the media playback system 506 and the service provider 502. In some cases, however, the service provider 502 may be configured to communicate directly with the media playback system 506, and not configured to communicate directly with the media system 504. As such, the media system server 504 may communicate with the service provider 502 via the media playback system 506. FIG. 6B shows an example flow diagram of a method 650 for an embodiment in which the media playback system 506 provides communication between the media system server 504 and the service provider 502.

Method 650 shown in FIG. 6B presents an embodiment of a method that can be implemented within an operating environment involving, for example, the media playback system 100 of FIG. 1, one or more of the playback device 200 of FIG. 2, one or more of the control device 300 of FIG. 3, and the media playback system environment 500 of FIG. 5. In other words, the method 600 may be performed by any one or more of the devices, systems, and servers described above. Method 650 may include one or more operations, functions, or actions as illustrated by one or more of blocks 652-658. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 652, the method 650 involves receiving from a service provider, data indicating a first media item to be played. In one example, a device, such as a playback device in the media playback system 506 may generally be configured to receive, from the service provider 502, media content to be played by the playback device and/or other playback devices in the media playback system 506. The first media item may be the media item received from the service provider 502 in response to an input from a user of the media playback system 506, as discussed previously in connection to FIG. 6A.

At block 654, the method 650 involves sending to a computing device, media data identifying the first media item that is to be played. Continuing with the examples above, the computing device may be the media system server 504. In one example, the service provider 502, when providing the first media item to the playback device for playback, may also provide metadata associated with the first media item. In some cases, some or all of the metadata may be displayed on a controller interface for the media playback system 506 if and when the first media item is played by the playback device. In one case, the playback device may send to the media system server 504, media data containing the some or all of the metadata identifying the first media item.

At block 656, the method 650 involves receiving from the computing device, a transmission indicating that the first media item is not to be played. In one example, the media system server 504 may determine whether the first media item is to be played, and send a transmission to the media playback system 506, as discussed above with respect to method 600 shown in FIG. 6A. At block 656 of method 650, the media playback system 506 may receive the transmission indicating that the media item is not to be played, and accordingly, does not play the media item. In one example, the media playback system 506 may be configured to proceed with playing the first media item if no transmission indicating the contrary is received within a predetermine period of time.

At block 658, the method 650 involves sending to the service provider, a transmission indicating a request for a second media item. Continuing with the examples above, the media playback system 506 may send a transmission to the service provider 502 requesting a different, second media item to be played. In one example, the transmission may indicate one or more user accounts and/or preference data indicating why the first media item is not to be played and why the second media item is requested.

FIG. 6C shows an example flow diagram of a method 670 for an embodiment in which the service provider 502 provides the different media item based on the received transmission. Method 670 shown in FIG. 6C presents an embodiment of a method that can be implemented within an operating environment involving, for example, the media playback system 100 of FIG. 1, one or more of the playback device 200 of FIG. 2, one or more of the control device 300 of FIG. 3, and the media playback system environment 500 of FIG. 5. In other words, the method 650 may be performed by any one or more of the devices, systems, and servers described above. Method 650 may include one or more operations, functions, or actions as illustrated by one or more of blocks 652-658. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 672, the method 670 involves providing to a media playback system, a first media item to be played. Continuing with the above example, the first media item may be the media item provided to the media playback system 506 as identified by the media data of block 606, in connection to FIG. 6A.

At block 674, the method 670 involves receiving a transmission indicating the first media item is not to be played. The transmission may be the transmission indicating a request for a different media item as provided by the media playback system 506 at block 658 of FIG. 6B, or the transmission provided by the media system server 504 at block 612 of FIG. 6A. In addition, the transmission may include the identification of an additional user account(s) that is interfacing with the media playback system 506.

At block 676, the method 670 involves identifying a second media item based on the received transmission. In one case, the service provider 502 may identify the second media item based on the input and/or media preferences (associated with the first user account 508, for example) that caused the service provider 502 to identify the first media item that was previously provided to the media playback system 506. In another case, if the received transmission identifies an additional user account that is interfacing with the media playback system 506, the service provider 502 may identify the second media item based at least partially on the profile of the additional user account in addition to the profile of the first user account (similar to the method 680 discussed below).

Block 678 of method 670 involves sending to the media playback system, the second media item to be played. The service provider 502 may send the second media item to the media playback system 506 for playback. In some cases, the service provider 502, if in communication with the media system server 504, may send to the media system server 504, media data identifying the second media item. Other examples are also possible.

Figure 6D:
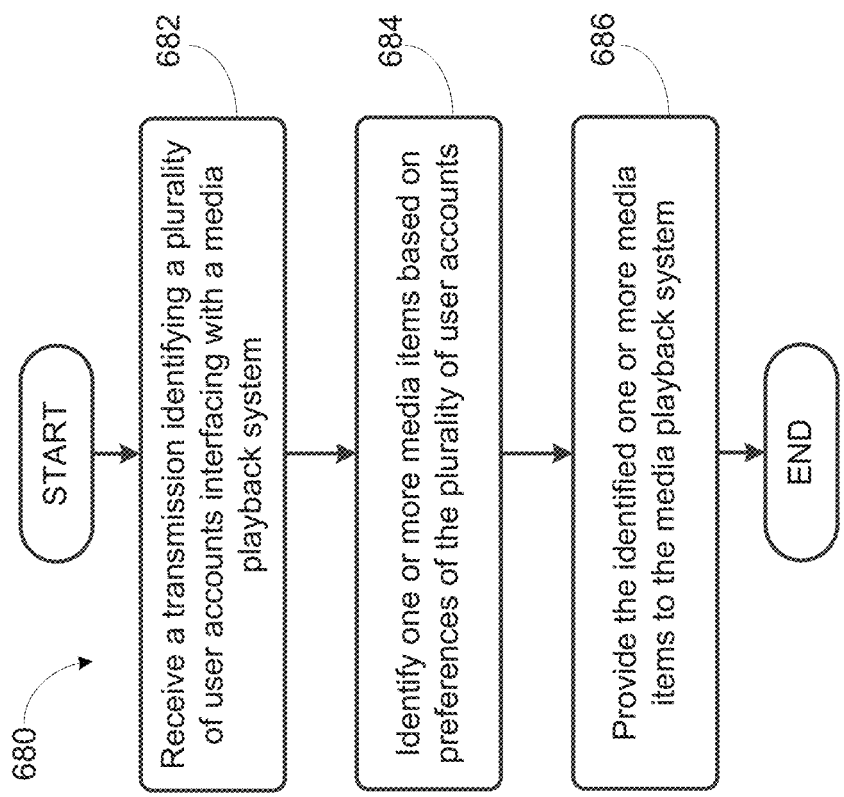
FIG. 6D shows an example flow diagram for providing media content based on media preferences of multiple user accounts.

FIG. 6D shows an example flow diagram of a method 680 for an embodiment in which the service provider 502 provides the media items based on the profiles of a plurality of user accounts interfacing with the media playback system 506. Method 680 shown in FIG. 6D presents an embodiment of a method that can be implemented within an operating environment involving, for example, the media playback system 100 of FIG. 1, one or more of the playback device 200 of FIG. 2, one or more of the control device 300 of FIG. 3, and the media playback environment 500 of FIG. 5. In other words, the method 680 may be performed by any one or more of the devices, systems, and servers described above. In one example, the functions discussed in relation to the method 680 may be performed by one the service provider 502. Method 680 may include one or more operations, functions, or actions as illustrated by one or more of blocks 682-686. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 682, the method 680 involves receiving a transmission identifying a plurality of user accounts interfacing with a media playback system. The plurality of user accounts may be the user accounts that are currently interfacing with the media playback system 506.

At block 684, the method 680 involves identifying one or more media items based on the preferences the plurality of user accounts. As one example, the service provider 502 may analyze the preferences of the identified user accounts, and based on those preferences, identify media content. Continuing with the example, if each of the preferences of the identified user accounts indicate a preference for smooth jazz music, the sever provider 502 may identify a smooth jazz song. In another example, the media items may be identified by ignoring a media item that has a negative preference associated with any of the plurality of user accounts.

In some cases, identifying common preferences between profiles may be difficult, for example, if there are a large number of users currently interfacing with the system. In such a situation, media items may be identified based on the most common preference amongst the plurality of users. As another example, the media item that has the most number of "likes" (or any other form of positive preference) across the plurality of user accounts may be identified, regardless of whether one of the plurality of user accounts has a negative preference associated with the media item.

As another example, a cumulative preference percentage for the media item may be determined. The cumulative preference percentage of the media item may be determined as a percentage of the identified user accounts that have a negative preference associated with the media item subtracted from a percentage of the identified user accounts that have a positive preference associated with the media item. As such, if eight out of 10 identified user accounts have a positive preference associated with the particular genre of music, but the remaining two identified user accounts have a negative preference associated with the particular genre of music, the cumulative preference percentage may be 80%–20% =60%. In such a case, a media item with the highest cumulative preference percentage may be selected.

As yet another example, songs may be identified for each of the user accounts interfacing with the media playback system, identifying songs based on the preferences of that account. If any of the identified songs are common between the profiles, they can be selected for transmission. Other examples are possible as well.

At block 686, the method 680 involves providing the identified one or more media items to the media playback system. Continuing with the examples above, the one or more media items may be provided to the media playback system 506. In addition to providing the media item(s), metadata indicating why the item(s) was selected may also be included. For example, the metadata could identify characteristics common to the preferences of the plurality of user accounts. Providing such metadata will allow users of the media playback system to understand why the media items were selected.

One having ordinary skill in the art will appreciate the method 680 as described above provides just one example of a service provider identifying media content based on media preferences of multiple users. Other examples are also possible.

In addition, one having ordinary skill in the art will appreciate that the examples discussed above may be applied in various media playback scenarios. For instance, the embodiments described herein may generally be applied to a scenario in which the service provider 502 provides media items that were requested, but not specifically chosen using the first user account 508 (i.e. a selection of a catered playlist, or a radio channel, among others). On the other hand, if the first user account 508 was used to explicitly and specifically select a media item, the media item may be played by the media playback system, whether any preference, positive or negative is identified. In such a case, the process of identifying a preference associated with the second user account 510 may be simply bypassed. Alternatively, an indication that the media item was explicitly and specifically selected using the first user account 508 may override any preferences associated with the second user account 510 when determining whether the media item should be played. In addition to the scenarios described above, embodiments herein may also be implemented and/or applied in other media playback scenarios to achieve similar or difference purposes as well, such as a parental control of media content. Other examples are also possible.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the examples provided herein involve managing playback of media content by a media playback system based on identified preference data associated with one of a plurality of user accounts interfacing with the media playback system. In one embodiment, a method is provided. The method involves maintaining, by a computing device, a plurality of user accounts associated with a media playback system, the media playback system comprising at least one playback device, receiving, by the computing device, user data identifying which of the plurality of user accounts are currently interfacing with the media playback system, receiving, by the computing device, media data identifying a media item to be played by the media playback system, identifying, by the computing device, for at least one of the plurality of user accounts that are currently interfacing with the media playback system, preference data associated with the media item, and determining, by the computing device, that the media item is not to be played by a media playback system, based on the identified preference data.

In another embodiment, a device is provided. The device includes a processor, and memory having stored thereon instructions executable by the processor to cause the device to perform functions. The functions include maintaining a plurality of user accounts associated with a media playback system, the media playback system comprising at least one playback device, receiving user data identifying which of the plurality of user accounts are currently interfacing with the media playback system, receiving media data identifying a media item to be played by the media playback system, identifying for at least one of the plurality of user accounts that are currently interfacing with the media playback system, preference data associated with the media item, and determining that the media item is not to be played by a media playback system, based on the identified preference data.

In yet another embodiment, a non-transitory computer readable memory is provided. The non-transitory computer readable memory has stored thereon instructions executable by a computing device to cause the computing device to perform functions. The functions include maintaining a plurality of user accounts associated with a media playback system, the media playback system comprising at least one playback device, receiving user data identifying which of the plurality of user accounts are currently interfacing with the media playback system, receiving media data identifying a media item to be played by the media playback system, identifying for at least one of the plurality of user accounts that are currently interfacing with the media playback system, preference data associated with the media item, and determining that the media item is not to be played by a media playback system, based on the identified preference data.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A method to be performed by a computing system, the method comprising:

receiving, via a network interface, an instruction to queue a container of first audio tracks into a queue for playback by a playback device of a media playback system, wherein the container of first audio tracks consists of: (a) an album, (b) a playlist, or (c) an internet radio station, and wherein the queue comprises one or more second audio tracks that were added to the queue individually;

while the playback device is playing back the queue via one or more speakers and before each first audio track of the container is played back, determining whether the respective first audio track is associated with a negative preference;

when the respective first audio track is associated with the negative preference, advancing playback over the respective first audio track to a next audio track within the queue; and when a given audio track in the queue was individually added to the queue, playing back the given audio track regardless of whether any negative preference is associated with the given audio track.

2. The method of claim 1, wherein receiving the instruction to queue the container of first audio tracks into the queue comprises receiving, via the network interface from one or more servers of a streaming audio service, data representing instructions to queue the container of first audio tracks, wherein each first audio track is streamable from a respective uniform resource identifier identifying a source of the respective first audio track at one or more servers associated with the streaming audio service.

3. The method of claim 1, wherein receiving the instruction to queue the container of first audio tracks into the queue comprises receiving, via the network interface from one or more servers of a first cloud service, data representing instructions to queue the container of first audio tracks, wherein each first audio track is streamable from a respective uniform resource identifier identifying a source of the respective first audio track at one or more servers associated with a second cloud service.

4. The method of claim 1, further comprising:
receiving, via the network interface from a control device of the media playback system, an instruction to queue a particular second audio track of the one or more second audio tracks.

5. The method of claim 4, wherein playing back the given audio track regardless of whether any negative preference is associated with the given audio track comprises:
before the particular second audio track is played back, determining that the particular second audio track is associated with the negative preference; and
overriding the negative preference associated with the particular second audio track based on the particular second audio track being queued individually in the queue such that the particular second audio track is played back regardless of the associated negative preference.

6. The method of claim 1, wherein determining whether the respective audio first track is associated with the negative preference comprises:
identifying one or more user accounts currently interfacing with the playback device via respective control devices of the media playback system;
querying one or more databases for preference data (i) associated with the identified one or more user accounts and (ii) that corresponds to the respective first audio track; and determining whether the queried preference data indicates that the respective first audio track is associated with the negative preference.

7. The method of claim 6, wherein querying the one or more databases for preference data comprises transmitting, to one or more servers, data representing a query for the preference data (i) associated with the identified one or more user accounts and (ii) that corresponds to the respective audio track.

8. The method of claim 1, wherein the playback device playing back the queue comprises the playback device streaming the audio tracks of the container according to a playback sequence defined by the container.

9. The method of claim 1, further comprising:
in response to advancing playback over the respective first audio track to the next audio track within the queue, transmitting, to at least one playback device of the media playback system, one or more state variables indicating next audio track within the queue currently being played back by the playback device.

10. A computing system comprising:
a network interface;
one or more processors;
data storage storing instructions that, when executed by the one or more processors, cause the computing system to perform functions comprising:
receiving, via the network interface, an instruction to queue a container of first audio tracks into a queue for playback by a playback device of a media playback system, wherein the container of first audio tracks consists of: (a) an album, (b) a playlist, or (c) an internet radio station, and wherein the queue comprises one or more second audio tracks that were added to the queue individually;
while the playback device is playing back the queue via one or more speakers and before each first audio track of the container is played back, determining whether the respective first audio track is associated with a negative preference;
when the respective first audio track is associated with the negative preference, advancing playback over the respective first audio track to a next audio track within the queue; and
when a given audio track in the queue was individually added to the queue, playing back the given audio track regardless of whether any negative preference is associated with the given audio track.

11. The computing system of claim 10, wherein receiving the instruction to queue the container of first audio tracks into the queue comprises receiving, via the network interface from one or more servers of a streaming audio service, data representing instructions to queue the container of first audio tracks, wherein each first audio track is streamable from a respective uniform resource identifier identifying a source of the respective first audio track at one or more servers associated with the streaming audio service.

12. The computing system of claim 10, wherein receiving the instruction to queue the container of first audio tracks into the queue comprises receiving, via the network interface from one or more servers of a first cloud service, data representing instructions to queue the container of first audio tracks, wherein each first audio track is streamable from a respective uniform resource identifier identifying a source of the respective first audio track at one or more servers associated with a second cloud service.

13. The computing system of claim 10, wherein the functions further comprise:

receiving, via the network interface from a control device of the media playback system, an instruction to queue a particular second audio track of the one or more second audio tracks.

14. The computing system of claim 13, wherein playing back the given audio track regardless of whether any negative preference is associated with the given audio track comprises:
before the particular second audio track is played back, determining that the particular second audio track is associated with the negative preference; and
overriding the negative preference associated with the particular second audio track based on the particular second audio track being queued individually in the queue such that the particular second audio track is played back regardless of the associated negative preference.

15. The computing system of claim 10, wherein determining whether the respective first audio track is associated with the negative preference comprises:
identifying one or more user accounts currently interfacing with the playback device via respective control devices of the media playback system;
querying one or more databases for preference data (i) associated with the identified one or more user accounts and (ii) that corresponds to the respective first audio track; and
determining whether the queried preference data indicates that the respective first audio track is associated with the negative preference.

16. The computing system of claim 15, wherein querying the one or more databases for preference data comprises transmitting, to one or more servers, data representing a query for the preference data (i) associated with the identified one or more user accounts and (ii) that corresponds to the respective first audio track.

17. The computing system of claim 10, wherein the playback device playing back the queue comprises the playback device streaming the audio tracks of the container according to a playback sequence defined by the container.

18. The computing system of claim 10, wherein the functions further comprise:
in response to advancing playback over the respective first audio track to the next audio track within the queue, transmitting, to at least one playback device of the media playback system, one or more state variables indicating next audio track within the queue currently being played back by the playback device.

19. Tangible, non-transitory computer-readable media having stored thereon instructions that, when executed by one or more processors of a computing system, cause the computing system to perform functions comprising:
receiving, via a network interface, an instruction to queue a container of first audio tracks into a queue for playback by a playback device of a media playback system, wherein the container of first audio tracks consists of: (a) an album, (b) a playlist, or (c) an internet radio station, and wherein the queue comprises one or more second audio tracks that were added to the queue individually;
while the playback device is playing back the queue via one or more speakers and before each first audio track of the container is played back, determining whether the respective first audio track is associated with a negative preference;
when the respective first audio track is associated with the negative preference, advancing playback over the respective first audio track to a next audio track within the queue; and
when a given audio track in the queue was individually added to the queue, playing back the given audio track regardless of whether any negative preference is associated with the given audio track.

20. The tangible, non-transitory computer-readable media of claim 19, wherein determining whether the respective first audio track is associated with the negative preference comprises:
identifying one or more user accounts currently interfacing with the playback device via respective control devices of the media playback system;
querying one or more databases for preference data (i) associated with the identified one or more user accounts and (ii) that corresponds to the respective first audio track; and
determining whether the queried preference data indicates that the respective first audio track is associated with the negative preference.

* * * * *